Jan. 25, 1938.  P. ANGENIEUX ET AL  2,106,397
OPTICAL ADJUSTING DEVICE FOR CINEMATOGRAPHIC APPARATUS
Filed April 6, 1935

INVENTORS
Pierre Angenieux
and
Jean Marie Gustmann
by their attys
Byrnes Stebbins & Blenko Patented Jan. 25, 1938

2,106,397

UNITED STATES PATENT OFFICE 2,106,397

OPTICAL ADJUSTING DEVICE FOR CINEMATOGRAPHIC APPARATUS

Pierre Angénieux and Jean Marie Gutmann, Paris, France

Application April 6, 1935, Serial No. 15,004
In France April 16, 1934

4 Claims. (Cl. 88—16.4)

This invention relates to polychromic photography, and more particularly to polychromic cinematography in which several objectives are used.

In accordance with certain methods for producing motion picture films in color and for projecting the same, groups of images in the primary colors are produced on the film or films. When these images are reproduced on the screen by suitable projection apparatus, it is essential that each group of elementary images shall be accurately superposed on the screen. It is accordingly essential in the commercial practice of these methods that the images of each group which combine to reproduce on the screen the natural colors of the scene shall have precisely identical relative positions on the films of the different cameras. As the complete reel used in projecting the scenes may be made up as a composite of films taken with different cameras, it is essential that the projection objectives shall be independently and collectively brought into such adjustment that the portion of the film recorded by one camera shall project on the screen a picture in its respective color on which may be exactly superposed the pictures projected from the other portions of film in the remaining colors. The least error in superposing the pictures of different colors gives rise to colored fringes upon the outline of projected objects, thus causing considerable blurring. Let it be assumed that the position on a film of two identical images taken with a certain camera is displaced to the extent of 0.1 mm. relative to the position of the two corresponding images produced on a film by another camera. Let it be assumed further that the projection objectives are correctly adjusted for the superposition of the images of the first film. In such case, the correct superposition cannot be obtained for the second film. The resulting colored fringes edging the outline of the projected objects will, in case of an enlargement of the picture by 300 for example, have a width of 300 times 0.1 mm. That is to say, an inaccuracy of 0.1 mm. on the film will give an inaccuracy of 30 mm. when the scene is projected on the screen, in which case the scene is, of course, hopelessly blurred.

This has placed such heavy requirements for extraordinary accuracy upon the optical devices of motion picture cameras for polychromic cinematograph that with the mechanical means at present available for their construction, the necessary precision can scarcely be obtained. Errors can arise both in the manufacture of the mechanical elements themselves and from the centering of each of the lenses constituting the objectives.

We propose to take care of inexactness in the relative positioning of the images on the films in the several colors by providing an optical system for such photographic apparatus in which the objectives are adjustable. In accordance with our invention, the objectives are brought to and held in adjusted position by a displacement perpendicular to the optical axis of the respective objective. We have provided apparatus in which the objectives, which together constitute the optical system, may be adjusted so as, on the one hand, to bring the optical axes of these objectives to a precisely predetermined relative position and, on the other hand, to adjust this assembly when mounted in the camera to a position which is, with respect to the direction of movement of the film, strictly identical for all the cameras.

The present invention is applicable to each and all of the methods of polychromic cinematography in which several objectives are used to obtain several images.

In accordance with the preferred embodiment of our invention, certain of the objectives are mounted eccentrically with respect to their optical axes. A given objective may rotate in its housing upon such an eccentric axis, the optical axis then describing a cylinder. Certain of the objectives furthermore are surrounded by a ring which itself is eccentric with respect to the axis of its mounting. Accordingly, the rotation of this ring in its housing, combined with the rotation of the individual objectives on their eccentric axes, makes it possible to position the objectives in any desired relation within a certain field. In principal, for a photographic apparatus having an optical system constituted by $n$ objectives, the following method of operation should be adopted: One of these $n$ objectives will be fixed, a second will have an eccentric mounting and the $(n-2)$ objectives remaining will have an eccentric mounting surrounded by a ring eccentric with respect to the axis of the mounting. This constitutes the minimum of indispensable adjustments, but for ease of arrangement or access one may have no fixed objective, or may even apply the two methods of displacement to a larger number of objectives.

It is easy to see that it is thus always possible to bring the optical axes of the objectives into a predetermined relative position. As to obtaining a definite position of the assembly with respect to the position of the film in the camera, this is obtained through a keying of this assembly in the housing which is arranged for it in the camera, this keying being adjustable in position with respect to the optical system.

These various adjustments are preferably performed before the mounting of the optical device in the camera by marking for example upon a ground glass screen, in the position which they should have after adjustment, the points corresponding to the intersection of the optical axes of the objectives with their common focal plane coincident with the ground glass. Then by means of the different adjustments described above, the images of a point at infinity given by the objectives are brought into coincidence with the corresponding points marked on the ground glass. There may also be used a method of autocollimation or any other method, but the method of securing the adjustment does not limit the scope of the invention, which resides solely in the optical adjusting device itself.

An embodiment of the invention is illustrated by way of example in the accompanying drawing:—

The optical system comprises three objectives $O_1$, $O_2$ and $O_3$, their optical axes being designated by the conventional intersecting lines.

The objective $O_1$ is carried by a fixed mounting $m_1$.

The objective $O_2$ is carried by a mounting $m_2$ whose axis $a$ is eccentric with respect to the axis of the objective $O_2$. This mounting may thus, by turning in its housing, cause the axis of objective $O_2$ to describe in the plane of Figure 1 a circle of radius which we shall call $aO_2$, and which is equal to the distance between the two axes.

Figure 2:
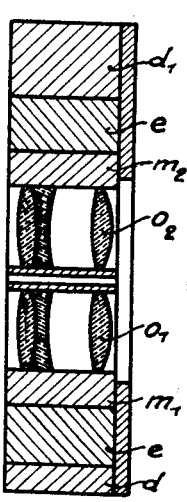
Figure 2 is a section along the line 2—2 of Figure 1.
Figure 1:
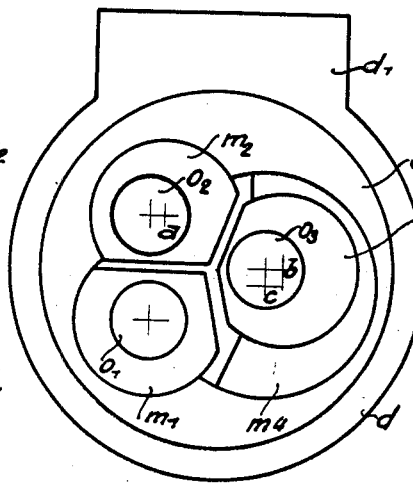
Figure 1 is a back view of an optical system composed of three objectives.
Figure 3:
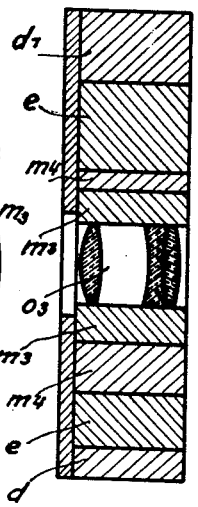
Figure 3 is a section along the line 3—3 of Figure 1.

The objective $O_3$ is carried by a mounting $m_3$, whose axis $b$ is eccentric with respect to the axis of the objective $O_3$; the mounting $m_3$ may thus cause the axis of the objective $O_3$ to describe in the plane of Figure 1 a circle of radius which we shall call $bO_3$ and which is equal to the distance between the axes. The mounting $m_3$ is itself housed in a ring $m_4$ whose axis $c$ is eccentric with respect to the axis $b$ of the mounting. It is thus seen that the axis of the objective $O_3$ may be given any positions comprised theoretically within a certain field determined here by the surface enclosed between two circles of centre $c$ and of radii $cb+bO_3$ and $cb-bO_3$.

Inasmuch as concerns the latitude of these different movements, the mechanical members do not permit in the present case complete rotation of each of the members. The optical axis of $O_2$ can only describe a part of the circumference and the optical axis of $O_3$ can only occupy a portion of the field theoretically fixed above. However, the latitude of these movements is sufficient if care is taken to ensure that the various members have a sufficient eccentricity.

Thus taking into consideration what has been described one may:

1. Bring the optical axis $O_2$ into a position such that the distance $O_1O_2$ is equal to a predetermined length.

2. Bring the axis $O_3$ into a position such that the distances $O_1O_3$ and $O_2O_3$ are respectively equal to lengths which are also strictly predetermined.

These positions are then secured by suitable locking devices.

Then there will be three objectives giving, in their commonal focal plane, three point images of a point situated at infinity. The relative positions of these objectives may be predetermined without errors creeping in due to defects in mechanical construction and due to inaccurate centering of the lenses constituting the objectives. These three point images determine a fixed triangle.

This having been effected and the mounting of the above optical device having been established in the camera, it is now necessary that this fixed triangle, which is on the sensitive surface of the film placed in the camera, have a position fixed relative to the direction of intermittent movement of the film.

For this purpose, the optical system is assembled in a block $e$ bounded outside by a cylindrical surface. The block $e$ is surrounded by a ring $d$, the outer surface of which comprises a parallelopiped part $d_1$ corresponding to a recess arranged in the camera in which it is fitted.

Then by a rotation of the block $e$ inside this ring $d$, it is possible to bring the imaginary triangle, which has been mentioned above, into a position fixed with respect to the direction of movement of the film and to maintain it there by a suitable locking.

It is evident that the device described above by way of a simple and in no wise limiting example may undergo modifications of form and of detail without departing from the spirit of the invention.

What we claim is:

1. An adjustable optical device for a polychromic motion picture camera having a ring adapted to be fixedly mounted in a recess provided in the motion picture camera, a cylindrical block rotatably mounted in said ring, three objectives having their axes disposed at the apices of a triangle for projecting three pictures of the same scene on a standard strip of film, a mounting for each objective, the three mountings being positioned in said block and at least two of said mountings being rotatably received in said block, each on an axis eccentric to the optical axis of their corresponding objective, whereby the relative positions of the three objectives with respect to each other and the position of the whole of the three objectives with respect to the direction of movement of the film in the camera can be adjusted.

2. An adjustable optical device for a polychromic motion picture camera having a ring adapted to be fixedly mounted in a recess provided in the motion picture camera, a cylindrical block rotatably mounted in said ring, three objectives having their axes disposed at the apices of a triangle for projecting three pictures of the same scene on a standard strip of film, a mounting for each objective, two of the three mountings being directly positioned in said block and at least one of said two mountings being rotatably received in said block on an axis eccentric to the optical axis of the corresponding objective, a ring in which the mounting of the third objective is rotatably received on an axis eccentric to the optical axis of the objective, said last mentioned ring being positioned in said block and rotatably mounted therein on an axis eccentric to the rotation axis of the mounting of the third objective, whereby the relative positions of the three objectives with respect to each other and the position of the whole of the three objectives with respect to the direction of movement of the film in the camera can be adjusted.

3. An adjustable optical device for a polychromic motion picture camera having a ring adapted to be fixedly mounted in a recess provided in the motion picture camera, a cylindrical block rotatably mounted in said ring, three objectives having their axes disposed at the apices of a triangle for projecting three pictures of the same scene on a standard strip of film, a mounting for each objective, two of the three mountings being directly positioned in said block, one of said two mountings being fixedly mounted in said block and the other being rotatably mounted in said block on an axis eccentric to the optical axis of the corresponding objective, a ring in which the mounting of the third objective is rotatably received on an axis eccentric to the optical axis of said objective, said last mentioned ring being lodged in said block and rotatably mounted therein on an axis eccentric to the rotation axis of the mounting of the third objective, whereby the relative position of the three objectives with respect to each other and the position of the whole of the three objectives with respect to the direction of movement of the film in the camera can be adjusted.

4. An adjustable optical device for a polychromic motion picture camera comprising a ring having a radial outward projection adapted to be engaged in a corresponding recess of the motion picture camera, a cylindrical block rotatably mounted in said ring, three objectives having their axes disposed at the apices of a triangle for projecting three pictures of the same scene on a standard strip of film, a mounting for each objective, the three mountings being positioned in said block and at least two of said mountings being rotatably received in said block, each on an axis eccentric to the optical axis of their corresponding objective, whereby the relative positions of the three objectives with respect to each other and the position of the whole of the three objectives with respect to the direction of movement of the film in the camera can be adjusted.

PIERRE ANGÉNIEUX.
JEAN MARIE GUTMANN.